(12) United States Patent
Judd

(10) Patent No.: US 10,884,132 B1
(45) Date of Patent: Jan. 5, 2021

(54) BEACON-BASED PRECISION NAVIGATION AND TIMING (PNT) SYSTEM

(71) Applicant: US Department of Energy, Washington, DC (US)

(72) Inventor: Stephen Judd, Los Alamos, NM (US)

(73) Assignee: U.S. Department of Energy, Washington, DC (US)

(*) Notice: Subject to any disclaimer, the term of this patent is extended or adjusted under 35 U.S.C. 154(b) by 384 days.

(21) Appl. No.: 15/220,497

(22) Filed: Jul. 27, 2016

Related U.S. Application Data

(60) Provisional application No. 62/247,515, filed on Oct. 28, 2015.

(51) Int. Cl.
| | | |
|---|---|---|
| *G01S 19/08* | (2010.01) | |
| *G01S 19/12* | (2010.01) | |
| *H04B 7/185* | (2006.01) | |
| *H04L 1/00* | (2006.01) | |
| *H04K 3/00* | (2006.01) | |
| *H04L 5/00* | (2006.01) | |
| *H04B 1/04* | (2006.01) | |
| *G01S 19/01* | (2010.01) | |

(52) U.S. Cl.
CPC ............. *G01S 19/08* (2013.01); *G01S 19/12* (2013.01); *G01S 19/01* (2013.01); *H04B 7/18504* (2013.01); *H04B 2001/0408* (2013.01); *H04K 3/20* (2013.01); *H04L 1/0056* (2013.01); *H04L 5/005* (2013.01); *H04L 5/006* (2013.01)

(58) Field of Classification Search
CPC .......... G01S 19/08; G01S 19/12; G01S 19/01; H04B 7/18504; H04K 3/20
USPC .......................... 342/357.45, 357.49, 357.39
See application file for complete search history.

(56) References Cited

U.S. PATENT DOCUMENTS

| | | | | |
|---|---|---|---|---|
| 5,280,497 A * | 1/1994 | Levitan | ................. | H04L 9/0662 348/E7.054 |
| 5,381,475 A * | 1/1995 | Cavallo | .................... | H04B 3/20 379/402 |
| 5,436,632 A * | 7/1995 | Sheynblat | ................. | G01S 5/02 342/357.64 |
| 5,884,220 A * | 3/1999 | Farmer | ................... | G01S 19/41 342/357.44 |
| 6,078,286 A * | 6/2000 | Gonzales | ............. | H01Q 1/1257 342/357.41 |
| 6,246,713 B1 * | 6/2001 | Mattisson | .............. | H04B 1/713 370/343 |
| 7,697,885 B2 * | 4/2010 | Stoddard | .................. | H04K 3/28 455/1 |
| 8,170,467 B2 * | 5/2012 | Stoddard | .................. | H04K 3/28 455/1 |
| 8,199,692 B2 * | 6/2012 | Trautenberg | ............ | G01S 19/02 370/316 |

(Continued)

*Primary Examiner* — Chuong P Nguyen
(74) *Attorney, Agent, or Firm* — Carmen P. Ekstrom; James C. Durkis; Brian J. Lally

(57) ABSTRACT

Beacon-based Precision Navigation and Timing (PNT) may use a constellation of space vehicles (e.g., small, low cost satellites) coupled to a network of ground stations and a network of beacons. Such a system be provided at a cost that is approximately 100 times lower than GPS both to build and to operate. The resulting system may also provide fast acquisition, improved SNR, improved anti-jam and anti-spoofing capabilities, and six-inch scale location determination, making it applicable to both existing PNT applications and enabling new applications.

26 Claims, 6 Drawing Sheets

(56) References Cited

U.S. PATENT DOCUMENTS

| | | | | |
|---|---|---|---|---|
| 8,239,694 B2* | 8/2012 | Saha | .................... | H02M 3/156 |
| | | | | 323/283 |
| 9,945,954 B2* | 4/2018 | McDonald | ............ | G01S 19/072 |
| 10,063,311 B2* | 8/2018 | Gopal | ................... | B64G 1/1021 |
| 2007/0006319 A1* | 1/2007 | Fitzgibbon | ................ | H04L 9/00 |
| | | | | 726/27 |
| 2007/0085735 A1* | 4/2007 | Bay | ........................ | G01S 19/50 |
| | | | | 342/357.33 |
| 2009/0093213 A1* | 4/2009 | Miller | ............... | H04B 7/18528 |
| | | | | 455/12.1 |
| 2012/0119934 A1* | 5/2012 | Melick | ................... | G01S 19/11 |
| | | | | 342/16 |

* cited by examiner

BEACON-BASED PRECISION NAVIGATION AND TIMING (PNT) SYSTEM

CROSS REFERENCE TO RELATED APPLICATION

This application claims the benefit of U.S. Provisional Patent Application No. 62/247,515 filed Oct. 28, 2015. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to precision navigation and timing, and more specifically, to high-accuracy beacon-based precision navigation and timing (PNT) using a system of beacons and a constellation of space vehicles.

BACKGROUND

Satellite-based precision navigation and timing (PNT), currently provided by a global positioning system (GPS), is a critical national capability. GPS has been a resounding success and provides essential capabilities for commerce, safety, and national defense, among others. As impressive and useful as the system has been, GPS has a number of well-known weaknesses. This is not surprising, as the system was originally designed in 1972, predating the microprocessor and lacking a priori knowledge of the vast array of modern commercial and defense needs that have evolved for the system.

The purpose of a PNT system is to allow a receiver on the ground to determine its time and location with high accuracy. Because there are four unknowns (x, y, z, and t), the receiver needs four independent measurements. The first three represent (x, y, z) position in three dimensions, and t represents time. Hence, at least four satellites need to be in view to obtain these measurements. If the time and position of each of the four satellites is known, the receiver may solve a set of nonlinear range equations to determine position and time.

The GPS system consists of 25 satellites in five planes at half-GEO (geostationary Earth orbit) altitude. Each satellite transmits a timing and navigation signal using a ~50 W transmitter through an array of helical antennas. The antenna array is designed to increase the gain towards the beam edge to provide a more uniform signal power at the Earth's surface. The signal is a data packet containing a series of digital bits. The navigation data is transmitted in a series of frames at 50 bits per second (bps). Each frame consists of 1500 bits, and hence takes 30 seconds to transmit, which is why it takes a modern GPS receiver around 30 seconds to acquire satellites from a "cold" restart.

The navigation data consists of the time and ephemeris of the satellite. The ephemeris of all the other satellites (i.e., the "almanac") is also transmitted, but this takes about 12.5 minutes to transmit and is rarely used. The ephemeris data consists of 17 parameters, most either 16 or 32 bits (with one 8 bits, one 14 bits, and one 24 bits), for a total of 366 bits. The receiver uses these parameters to propagate the satellite orbit to compute the satellite position at the time of transmission.

Each satellite applies a unique spreading code to this 50 bps signal. The spreading code is a length-1023 Gold code and the spreading rate is approximately 1 MHz. The ratio of the spreading rate to the data rate is termed the processing gain, which is 20,000, or 43 dB. This is also the signal-to-jammer ratio, or SJR. Each satellite has its own code and the codes have low cross-correlation. This use of code division multiple access (CDMA) allows all satellites to transmit on the same frequency.

To detect these signals, a receiver first acquires satellites by searching for all satellite codes through time and frequency space for the presence of a signal. The search through time is to search through all possible time shifts of the length 1023 code, and the search through frequencies is to search through all possible Doppler shifts. Once a signal is acquired, the receiver synchronizes to and decodes the bits. Once the time and ephemeris are decoded, the receiver computes the satellite position. With four or more such measurements, the receiver solves for its own time and position, typically using a least-squares technique.

Following initial synchronization with the satellites, a modern GPS receiver uses the waveform and frame structure to update the position solution more frequently. The length-1023 code is transmitted at 1.023 MHz, and hence repeats every 1 millisecond, providing time of arrival (and hence range) information at 1 millisecond intervals. Because the satellite ephemerides are known, and the time is known, the position may be updated as often as every millisecond using this technique, as opposed to every 30 seconds.

Each satellite must know its own ephemeris. This ephemeris is determined on the ground and transmitted to the satellite from a ground station at intervals of up to 2 hours. GPS ground stations are large facilities, staffed 24/7 by a minimum crew of three.

It is a great tribute to the insight and brilliance of the original GPS designers that 40 years later, the system remains both useful and practical. However, the arc of technology (such as modern electronics) and future applications could not have been anticipated, and as with any 40-year old technology, GPS has a number of weaknesses that limit performance.

Accuracy

The current GPS system has a stated 15-meter standard accuracy, whereas a driverless car or delivery drone requires 6-12 inch range accuracies. The biggest three sources of error are: (1) clock inaccuracy/drift; (2) ephemeris inaccuracies; and (3) ionospheric delay.

Weak Signal

The satellites are at a very high orbit, hence have enormous $1/r^2$ losses. Weak signals limit the system performance in buildings, mountains, etc.

Enormous Cost

Each GPS satellite costs around $225 million. Ground operations are $850 million per year. Launch costs are expensive, and the current block III program is around $7 billion for research, development, test, and evaluation (RDT&E).

No Upgrade Path

GPS was designed before the invention of the microprocessor, yet the system remains essentially unchanged and most modernization efforts require maintaining compatibility with that same 40-year old design. With other technologies, protocols transition: new protocols emerge, older protocols are gradually phased out, and the systems move upwards. Thus, a modern smartphone uses 4G LTE technology, not 1G technology. As missions and technologies evolve, a PNT system similarly should be able to evolve.

Accordingly, an improved PNT system capable of overcoming at least some of these deficiencies may be beneficial.

SUMMARY

Certain embodiments of the present invention may provide solutions to the problems and needs in the art that have not yet been fully identified, appreciated, or solved by conventional PNT technologies. For example, some embodiments of the present invention pertain to beacon-based PNT using a constellation of space vehicles (e.g., small, low cost satellites) coupled to a network of ground stations and a network of beacons. A goal of some embodiments is to provide a system that allows a driverless car or a delivery drone to navigate to six-inch accuracy using a receiver that can be mounted on the driverless car or delivery drone at a cost that is 100 times lower than GPS both to build and to operate. The resulting system may also provide fast acquisition, improved SNR, improved anti-jam and anti-spoofing capabilities, and six-inch scale location determination, both making it applicable to existing PNT applications and enabling new applications.

In an embodiment, a PNT system includes at least four ground beacons configured to transmit PNT beacon signals. The PNT system also includes a space vehicle configured to receive the PNT beacon signals from the beacons and update a space vehicle ephemeris based on position and timing information in the transmitted PNT signal.

In another embodiment, a PNT module includes a radio receiver configured to receive PNT beacon signals from ground beacons and an atomic clock configured to provide a timing reference. The PNT module also includes a field programmable gate array (FPGA), a microprocessor, or both, configured to process the received PNT beacon signals and generate timing and navigation data using information from the PNT beacon signals and the timing reference from the atomic clock. The PNT module further includes a radio transmitter configured to transmit a PNT module signal based on the generated timing and navigation data.

In yet another embodiment, a ground beacon includes a PNT module configured to transmit a PNT beacon signal. The PNT beacon signal includes a current time and position of the ground beacon.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
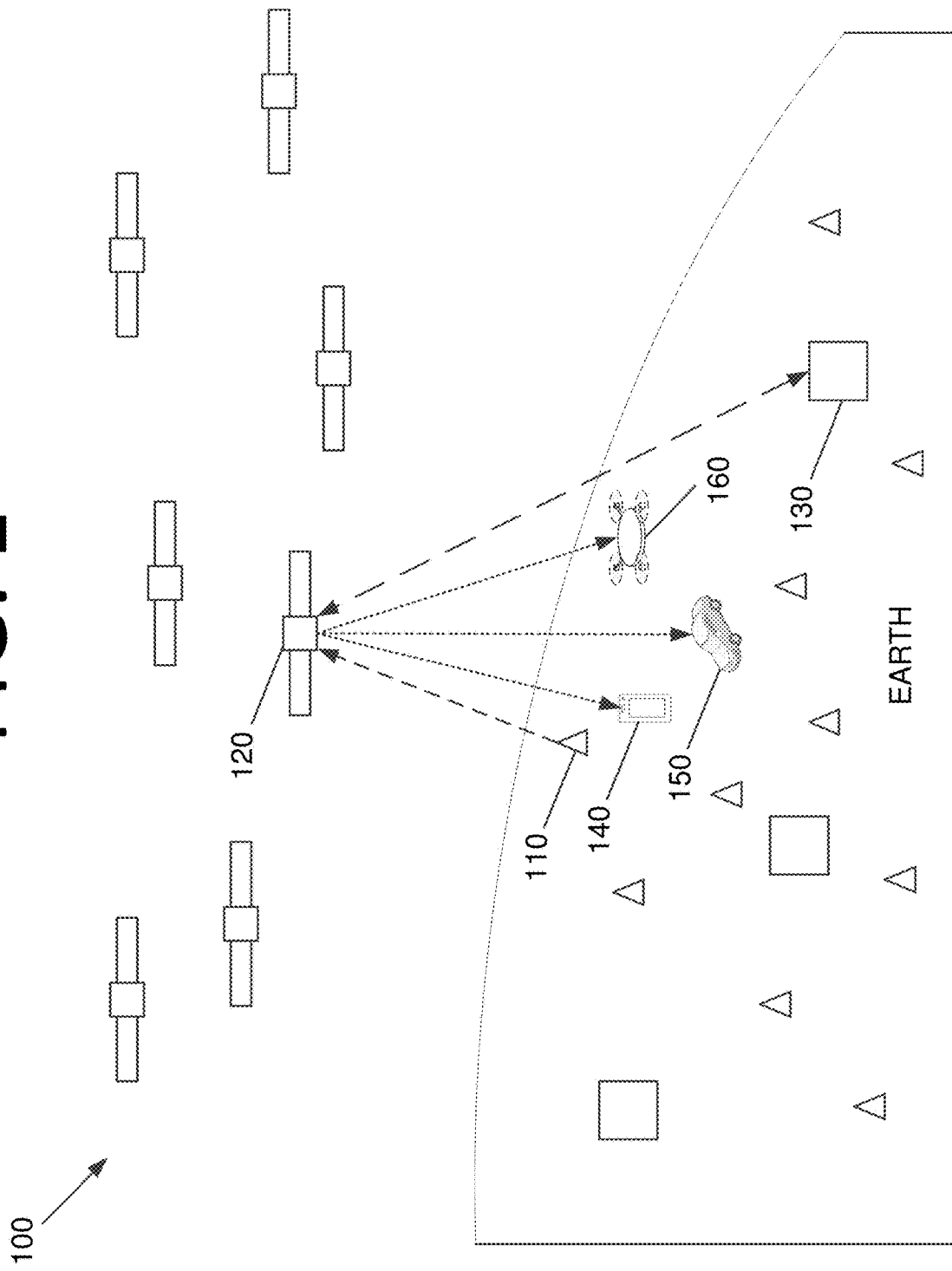
FIG. 1 is an architectural diagram of a PNT system, according to an embodiment of the present invention.

Some embodiments of the present invention pertain to beacon-based PNT using a constellation of space vehicles coupled to a network of ground stations and a network of beacons. In certain embodiments, a large constellation of small satellites (e.g., 100-200 satellites) at altitudes of 1,000-2,000 km may be used. Each satellite may be a 15×15×30 cm (6×6×12 in) satellite in some embodiments. Each satellite may contain an attitude determination and control system (ADCS), command and data handling (C&DH), at least one radio, a modified radio board to provide PNT services, and a propulsion system. The satellite in the dimensions discussed here with respect to some embodiments is larger than a traditional cubesat due to the requirement for increased solar power, improved thermal management, and housing of a propulsion system that assists the satellite in achieving a higher orbit than low Earth orbit (LEO), e.g., 1,000-2,000 km.

The PNT radio module may include a radio receiver and transmitter, an FPGA and/or digital microprocessor, and an atomic clock as a timing reference. The receiver may be used to receive beacon signals, the digital components may be used to process the signals and generate timing and navigation data, and the transmitter may be used to transmit the timing and navigation signals to a ground based receiver. In some embodiments, the PNT module may be a modification of an existing radio design, using a relatively low cost "chip-scale" atomic clock (e.g., that provided by Microsemi™). However, any other chip-sale atomic clock or a non-chip-scale atomic clock may be used without deviating from the scope of the invention Like GPS, the PNT module broadcasts timing and navigation signals. However, instead of transmitting a single signal like GPS, the module may transmit multiple signals simultaneously using CDMA. Each signal may be modulated with a different Gold code, providing different channels of information. In other words, whereas each GPS satellite is assigned to a single Gold code, in some embodiments, each satellite may be assigned to multiple Gold codes. A "basic" channel may provide basic PNT services, while other encrypted signals may provide precision services, high jam and spoof resistance, etc. Unused channels may be reserved for future use, providing a natural upgrade path. Forward error correction (FEC) may be used on all channels.

To provide precision navigation signals, each satellite has to know its time and location very precisely, and should update that knowledge relatively frequently. The required update rate depends on the drift of the satellite position due to drag and solar pressure effects, as well as the drift rate of the atomic clock. A chip-scale atomic clock generally requires updates every two minutes or so to maintain accuracy to 1 nanosecond. In general, more frequent updates will improve timing and position accuracy.

To achieve this level of accuracy, a set of small, low cost beacons may be located liberally around the Earth or a region thereof. The satellite should be able to receive signals from at least four beacons simultaneously to determine time and position, and in general, more beacons will improve the time and position determination. A conservative system may use one beacon located in each U.S. state, for example, to provide high redundancy across the continental U.S. Similar positioning may be used in other nations or groups of nations as well.

Each beacon may contain the same PNT module as the satellites, and may transmit a location/timing signal. The satellites may receive the signals from multiple beacons and compute their position at a high update rate (e.g., every 5-10 seconds). More specifically, the satellites may use the beacons to correct their time and ephemeris, which may then be transmitted to ground receivers.

Each beacon may be located precisely, and GPS may be used to discipline the clock. By using two frequencies at the beacon, a satellite may also able to determine the local ionospheric correction in real time. Thus, in some embodiments, GPS is used to locate the beacons, the beacons are used to locate the satellites, and the satellites are used to locate ground receivers. As the technology improves, it is expected that GPS may not be required by future beacons, and embodiments without GPS are envisioned herein without deviating from the scope of the invention.

Under normal conditions, the system in some embodiments is operated by a set of small, automated ground stations. In some embodiments, this may be as few as one ground station, although any number of ground stations may be used without deviating from the scope of the invention. Satellites may be reprogrammable on-orbit, enabling problems to be fixed and new features to be added post-launch.

To set up the constellation, the satellites may be launched to a low 400 km-type orbit, using a relatively small and relatively low cost rocket or other launch vehicle, and use onboard propulsion to boost their orbit to 1,000-2,000 km-type altitudes. The satellites may also be launched directly to a higher altitude using a larger, more powerful launch vehicle. The satellites may continue to use propulsion (e.g., ion thrusters) to maintain their constellation position. New satellites may be launched frequently (e.g., monthly, yearly, every few years, etc.) to replenish the constellation as desired. As technology improves, the satellites are expected to last longer, requiring fewer satellite replenishments as time goes on.

Compared to a traditional GPS receiver, the primary changes in receiver requirements of some embodiments are: (1) a higher chipping rate; (2) larger Doppler shift (and rate); and (3) forward error correction (FEC). Thus, while a traditional GPS receiver will not work as-is, a traditional GPS receiver may be readily modified to work with the new signals of some embodiments. Additionally, the system of some embodiments may transmit the current GPS signal (modulation rates, etc.) alongside the new signals, allowing existing GPS receivers to work with the system via a software-only upgrade. The result is a system that is high performance and upgradable, with very low operational costs compared to conventional GPS and a total constellation cost that is a fraction of a single GPS satellite.

FIG. 1 is an architectural diagram of a PNT system 100, according to an embodiment of the present invention. While not drawn to scale or necessarily showing all of the elements in the correct location, FIG. 1 is meant to show the various components of the system together for illustrative and conceptual purposes. A series of beacons 110 (shown as triangles) are located at various locations. A satellite 120 of a constellation of satellites (which may be operating 1,000-2,000 km above the Earth in some embodiments) receives the beacon signals from at least four independent beacons and uses the beacon signal to correct its ephemeris. Satellite 120 is also in communication with a ground station 130 of multiple ground stations (shown as squares). In contrast to GPS, which uses the ground stations to update satellite time and ephemeris, these ground stations are used only as needed to send various commands, receive state-of-health information from satellite 120, etc.

Satellite 120 transmits a PNT signal that may be received by various receivers on Earth. For instance, in FIG. 1, a cell phone 140, a driverless car 150, and a delivery drone 160 all receive the PNT signal. In concert with PNT signals received from other satellites of the constellation, cell phone 140, driverless car 150, and delivery drone 160 can determine their precise location within 6-12 inches in some embodiments.

Satellite

A goal of some embodiments is to minimize development time and cost. With careful design, the system can be built with minimal additional development by heavily leveraging existing satellite technology. The starting point for the system of some embodiments may be a relatively small cubesat-like satellite, using existing circuit boards generally as-is, with a slight size increase to increase the amount of solar power available for continuous operation and to accommodate the modified radio board and additional power equipment that may be required.

Figure 2:
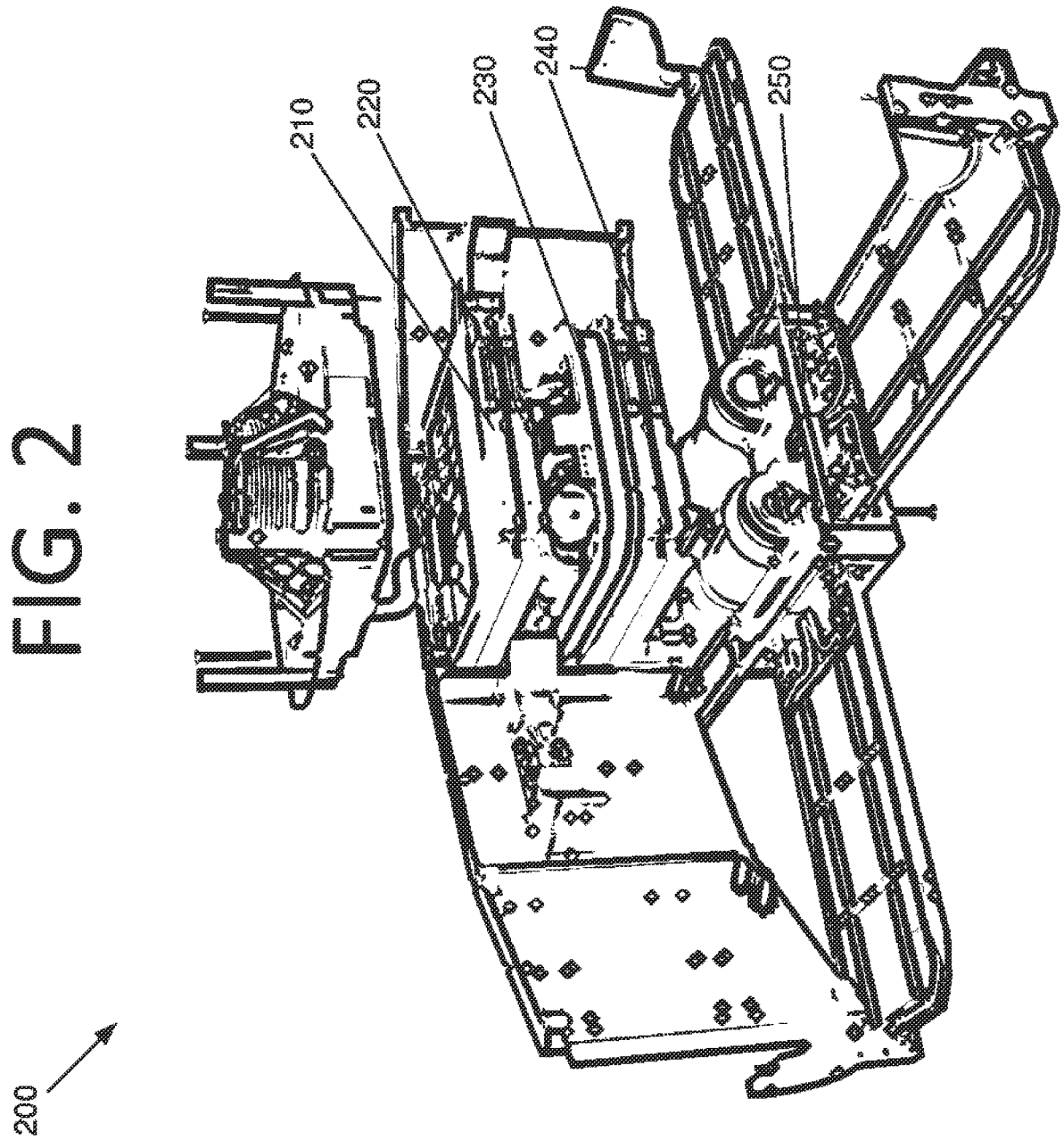
FIG. 2 is an exploded perspective view illustrating a cubesat with an opened chassis, according to an embodiment of the present invention.

FIG. 2 is an exploded perspective view illustrating a cubesat 200 with an opened chassis, according to an embodiment of the present invention. Cubesat 200 includes a high band digital radio 210, a low band digital radio 220, an ADCS module 230, a C&DH module 240, and a power module 250. Low band digital radio 220 may include a chip-scale atomic clock, enabling PNT in accordance with some embodiments.

The main driver on the satellite size is power. A 6 W power amplifier (i.e., six 1 W channels) of around 30% efficiency requires 20 W. Adding another 10 W for the satellite internals gives 30 W. A 15×25 cm bi-fold solar panel may provide 72 W of power—hence, sufficient margin for eclipse, etc. Increasing the satellite size to 20×20×30 cm may provide 112 W of total power. The point is that regardless of whether the satellite is 15 cm or 20 cm, the satellites are relatively small and can scale from existing designs in some embodiments. However, satellites or other space vehicles of any desired size may be used without deviating from the scope of the invention.

Approximately half the satellite is devoted to the propulsion unit in some embodiments. Electrical propulsion may be particularly advantageous in some embodiments, although chemical propulsion may still be used. Chemical propulsion is desirable from several viewpoints, but the high thrust may lead to significant engineering design requirements to stabilize the satellite. Electrical propulsion is typically slower, but simpler to "fly."

In principle, the satellite of some embodiments has three radios (a radio for ground station communications, a beacon receiver, and a PNT transmitter) and three antennas. By using unified S-band for all functions, however, this may be reduced to two radios and a single antenna in certain embodiments. The radio of some embodiments is approved to transmit and receive using unified S-band (USB). USB uses 2,200 MHz for the downlink and 2,100 MHz for the uplink. This provides wide enough separation between TX and RX to filter the signals, but provides signals close enough together that key electronic components have sufficient bandwidth to handle both signals. Thus, if USB can be used for all communications, the system may be greatly simplified, and not require new radio development. However, any desired non-USB frequency may be used in some embodiments, or a combination of USB and non-USB frequencies may be used, without deviating from the scope of the invention.

Figure 3:
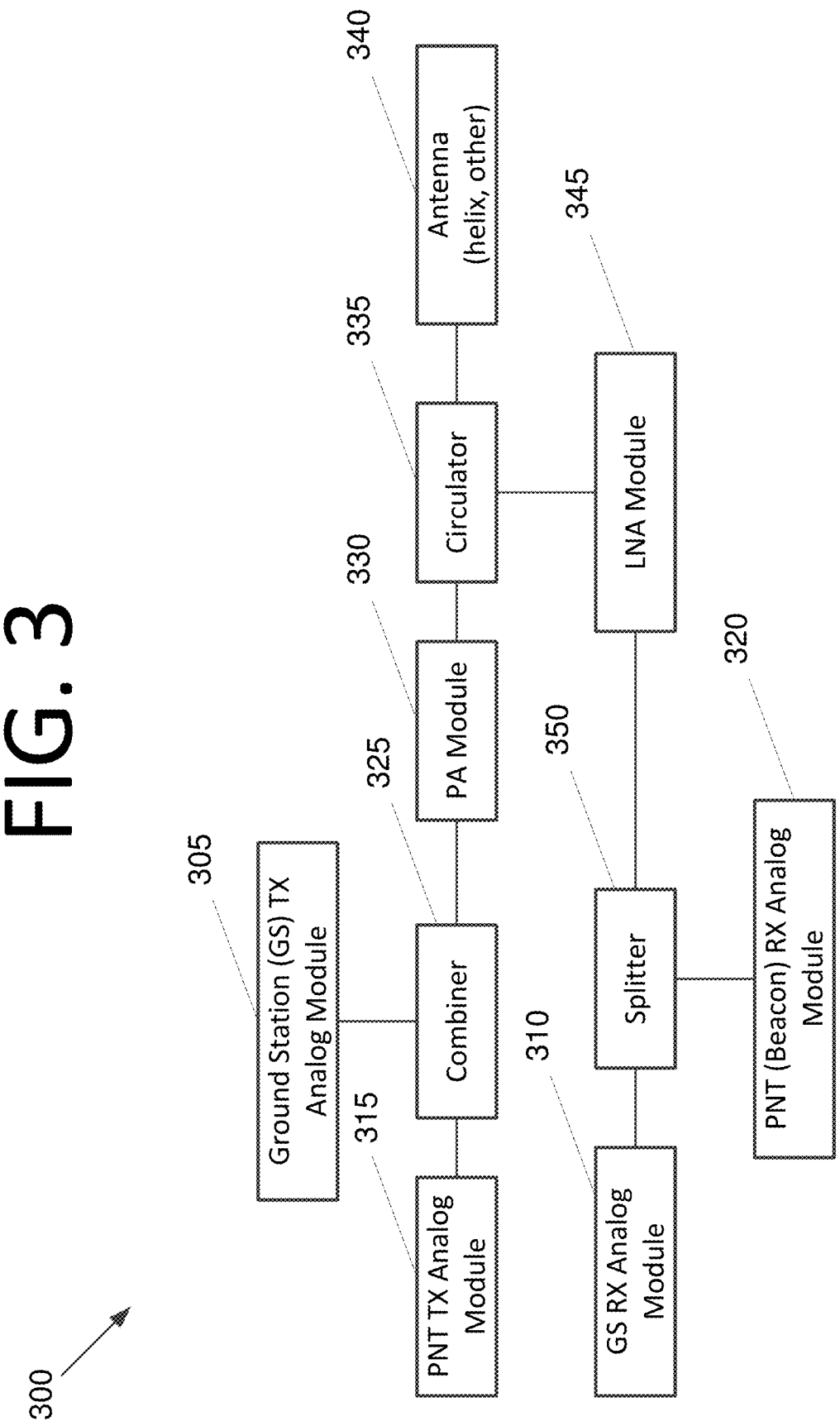
FIG. 3 is a block diagram illustrating a PNT module using a single antenna, according to an embodiment of the present invention.

FIG. 3 is a block diagram illustrating a PNT module 300, according to an embodiment of the present invention. PNT module 300 may be used by space vehicles, beacons, or both. Per the above, two radios may be used in some embodiments. A first radio may be used for ground station (GS) communications with a GS transmitter analog module 305 for sending signals and a GS receiver analog module 310 for receiving signals. A second radio may be used for PNT. A PNT receiver analog module 320 may be used to receive beacon signals, while PNT transmitter analog module 315 may be used to transmit the PNT signals. The PNT radio may use an atomic clock as a timing reference to maintain precision timing.

The two transmitted signals—one from each radio transmitter 305, 315—may be combined via a combiner 325 and sent to a power amplifier (PA) module 330 (e.g., a Triquint AP561™). The output may then be sent through a circulator 335 to an antenna 340, which may be helical or another suitable design. The process may be mirrored on the receive side. The circulator third output may be sent to a low noise amplifier (LNA) module 345. The output from LNA module 345 may be sent through a splitter 350 and the same signal may be provided to both radio receivers 310, 320. LNA module 345 may also contain a filter (not shown) to further cut down on the transmitted signal.

A single broadband or dual-frequency antenna may be used for antenna 340. The PNT requirements may determine the antenna size. At 2,000 km, a 100° beam width provides full Earth coverage. This corresponds to an antenna of around 7 dB gain, which happens to be the gain of a helix of a few turns, a patch antenna, or a log spiral antenna, providing multiple design options. However, in some embodiments, a custom antenna, e.g., a dipole array, is used to increase the amount of gain at the beam edges to improve the signal at the horizon.

In this scheme, PA module 330 and LNA module 345 are next to antenna 340, but the actual transmit and receive analog radio modules 305, 310, 315, 320 may be elsewhere in the satellite in some embodiments. This further simplifies the design requirements. The end result is that, assuming use of a standard propulsion module, the rest of the satellite hardware is essentially done if existing components are reused. A single antenna 340 may be used for all functions, with a couple of standalone RF boards to combine and route signals to the satellite. However, in other embodiments, multiple antennas may be used without deviating from the scope of the invention.

Figure 4:
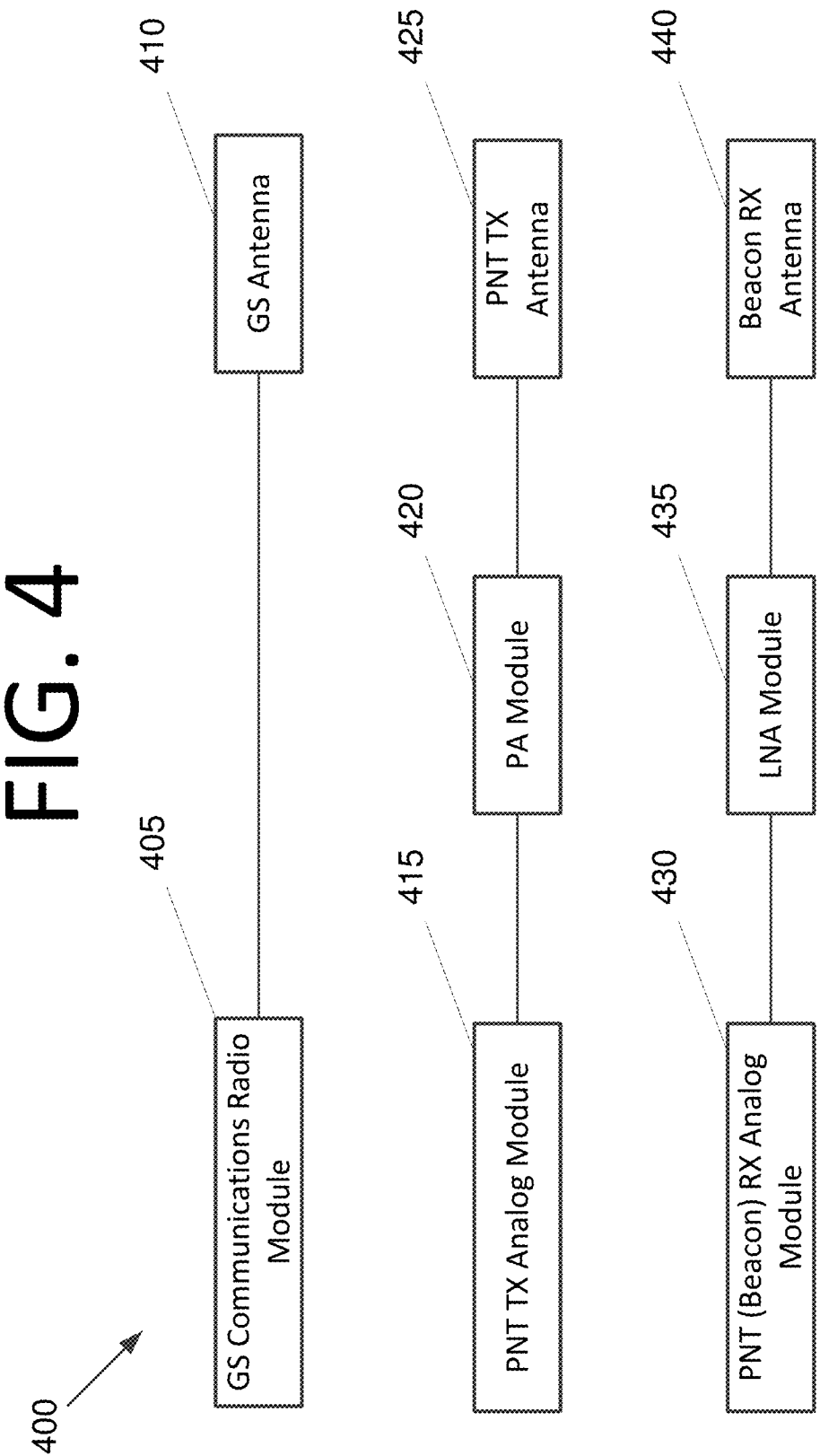
FIG. 4 is a block diagram illustrating a PNT module using multiple antennas, according to an embodiment of the present invention.

While a single antenna is used in some embodiments, multiple antennas may be used in other embodiments. FIG. 4 is a block diagram illustrating a PNT module 400 using multiple antennas, according to an embodiment of the present invention. In this embodiment, three antennas—a GS antenna 410, a PNT transmitter antenna 425, and a beacon receiver antenna 440—are used. However, any number of antennas may be used without deviating from the scope of the invention.

In this embodiment, a ground station (GS) communications radio module 405 uses GS antenna 410. PNT transmitter analog module 415 uses PA module 420 to amplify the signal to be transmitted, which is then sent by PNT transmitter antenna 425 for outbound PNT communications. A beacon receiver antenna 440 receives beacon signals and provides these signals to LNA module 435, which amplifies the signal. LNA module 435 then provides the amplified signal to PNT receiver analog module 430 for processing.

PNT Radio Module and Signal

Figure 5:
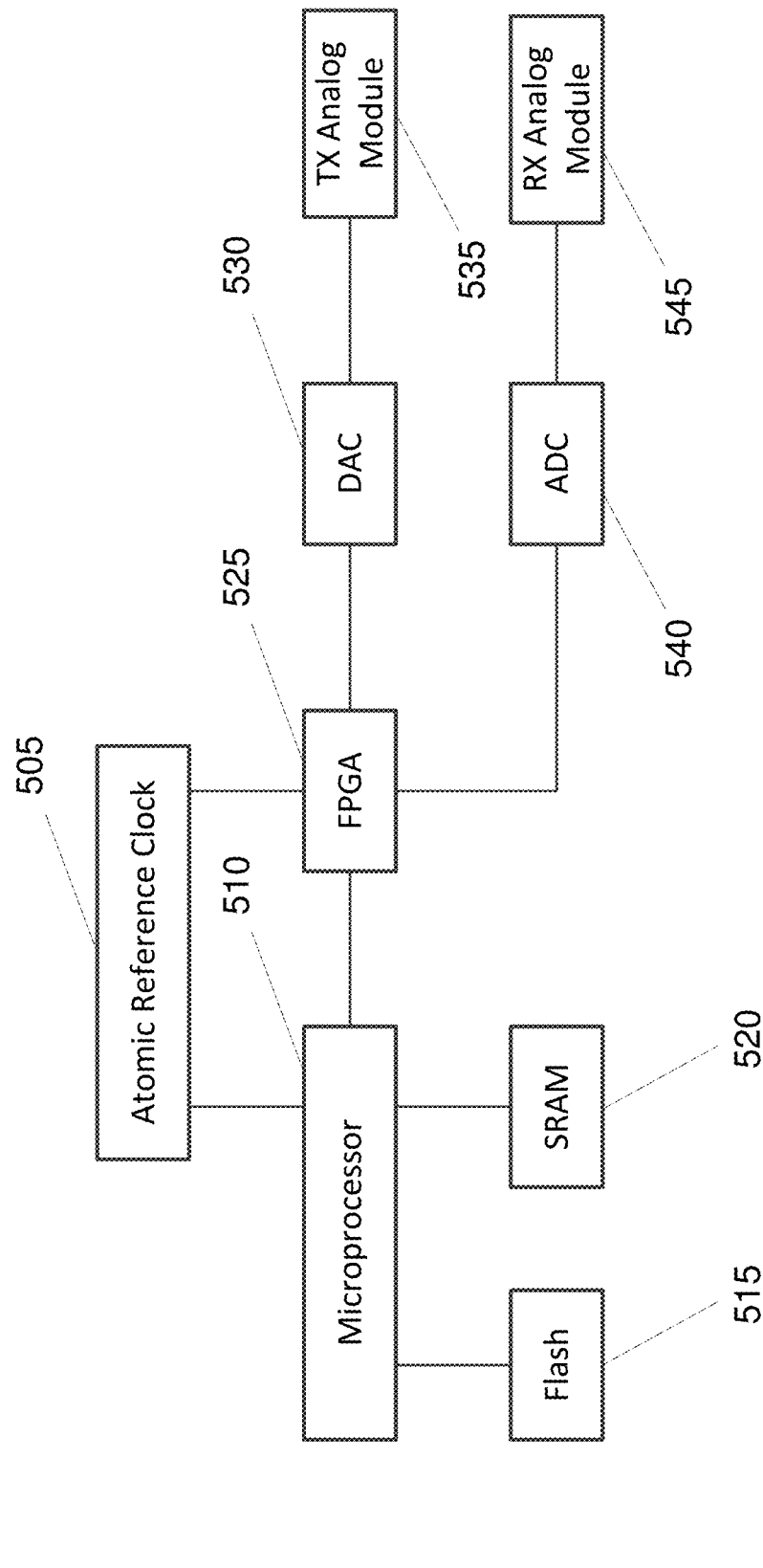
FIG. 5 is a block diagram illustrating a PNT radio module, according to an embodiment of the present invention.

As described earlier, the PNT radio module may be a radio with an atomic clock substituted for the current clock reference. FIG. 5 is a block diagram illustrating a PNT radio module 500, according to an embodiment of the present invention. PNT radio module 500 includes an FPGA 525, a digital microprocessor 510, and an atomic clock 505 as a timing reference. Microprocessor 510 accesses data stored in flash 515 and SRAM 520. FPGA 525 and microcontroller 510 may receive beacon signals, update atomic clock 505 and satellite position, and transmit the PNT signal. Each PNT channel may be a spread-spectrum signal. Encryption, FEC, etc. may all be performed by the radio. Each channel may use an 8.191 MHz chipping rate and a length 8191 Gold code (this chipping rate is not required, but may make the timing a bit more convenient at exactly 1 millisecond per code). Each satellite may have eight channels in some embodiments. Note that a length-8191 code provides approximately 40 dB of isolation between CDMA channels. Other code lengths and/or chipping rates may also be used without deviating from the scope of the invention.

The signals may be generated by the FPGA. All channels may be combined on FPGA 525 before being sent to a digital-to-analog converter (DAC) 530, which drives an RF modulator. Transmitter analog module 535 then receives the converted signal and sends the signal to the PA module and transmitter antenna (such as PA module 420 and PNT transmitter antenna 425 of FIG. 4). When signals are received, receiver analog module 545 receives the signal from an LNA module (such as LNA modules 345 and 435 of FIGS. 3 and 4, respectively) and sends the signal to an analog-to-digital converter (ADC) 540. FPGA 525 reads the converted signal from ADC 540, processes the signal, and may provide the digital signal to microprocessor 510.

The ability to transmit multiple information signals simultaneously provides considerable flexibility. Instead of combining all needed information on a single channel, such embodiments may split the signals of interest (SOIs) onto multiple channels.

Satellite Signal

As with GPS, a ground receiver needs to know the satellite ephemeris and a time, followed by a repeating timing signal. However, once the initial ephemeris and time are set, only ephemeris corrections may be needed in some embodiments—not the entire ephemeris. With GPS, the full ephemeris signal is around 500 bits. Because the corrections require considerably less data than the full ephemeris set, they may be transmitted on a separate channel at a lower data rate for improved SNR. Moreover, the receiver in some embodiments only needs to receive the ephemeris once, at startup. From an anti-jamming perspective, this means that a receiver (e.g., a drone) can receive the ephemeris once at startup, in a "safe" environment, and get later updates in less hospitable environments at a higher SNR.

A notional signal may be sent with two channels. Channel 1 may provide the satellite position (x, y, z). Each coordinate may be nominally 30 bits, offset from a fixed value (nominally earth radius+1,000 km in some embodiments). Units of millimeters past 2,000 km altitude may be provided. A total of 90 bits may be used in some embodiments for Channel 1, resulting in a total signal length of 9 seconds at 10 bps, 18 seconds at 5 bps, etc.

Channel 2 may provide time, satellite ephemeris, ionospheric correction, etc. The signal may be approximately 500 bits, similar to a GPS signal. At 100 bps, this takes approximately 5 seconds to transmit, and hence, acquire.

In this scheme, the receiver first acquires the satellite time and ephemeris, taking around 5 seconds. Then, the receiver tracks Channel 1 for both timing marks/pseudo-ranges and satellite position. The satellite position is compared to the position predicted from the ephemeris, and a correction is developed at roughly 10-20 second intervals. This process continues until the satellite passes out of view.

If anti-jamming is even more of a concern, one possibility is to use a third channel to also transmit (x, y, z) positions, but on a randomly changing center frequency within the approximately 80 MHz USB bandwidth. Unlike a traditional frequency-hopping system, this change may take place relatively slowly, e.g., every second, every 30 seconds, etc. The "key" describing the hopping sequence may be transmitted on yet another encrypted channel (or with the ephemeris). The goal of some embodiments is not to make an unjammable system, but rather, to make the jammer's task more difficult, requiring more than a simple jammer.

Beacon Signal

Because the beacon is "fixed" with respect to the Earth, it may only transmit a time (t) and beacon position signal (x, y, z) on Channel 1. The signal may be transmitted at an appropriate data rate to be received by the satellite. The satellite may compute its position, compare the computed position to its expected ephemeris position, and determine a correction factor. Note that after several such measurements, the satellite may determine and/or refine its ephemeris accurately.

The beacon may also be used to determine the ionospheric correction factor by transmitting on two frequencies. By comparing the time of arrival at the satellite of each frequency, the satellite can compute the correction. If the second frequency can be transmitted in the USB band, e.g., have one beacon signal at the bottom of the band and another at the top, this makes the process easier. If this is deemed impractical or insufficient, then a second frequency may be used, and a second receiver may be used at the satellite.

Link Estimates

Assume a 2,000 km altitude, and a satellite on the horizon as a worst case to bound the problem. A 2,000 km orbit means that the distance to satellite at the horizon is approximately 5,600 km. The path loss is 174 dBm at 2.2 GHz. Assuming 1 W TX power per channel, a 4 dB antenna gain gives a RX signal power of −140 dBm. This is not too different than the worst case for GPS. Assuming 3 dB NF, 6 dB EbN0, and MDS=−145 dbm at 100 bps and −155 dBm at 10 bps, the result is 5 dB of margin at horizon at 100 bps and 15 dB of margin at 10 bps. When the satellite is directly overhead, this margin improves by 9 dB to 14 dB and 24 dB, respectively. From the link margins above, it is clear why it is useful to transmit the important signal at a lower data rate.

The above link margins can be further improved in several ways. Higher transmit power can be used for channels of interest (not all channels need to have the same transmitter power). Better FEC can also be used (EbN0 of 3 gets 3 more dB), as can a better antenna at the satellite. A 7 dB antenna will be roughly 3 dB down at the horizon, giving 4 dB of gain. A better antenna may have a bowl-shaped antenna pattern to increase the gain at the horizon and decrease the gain straight ahead (i.e., directly underneath the satellite where the satellites are pointing straight down). This could give several more dB.

Satellites could also be placed at a lower altitude. This means that more satellites are required, however. A better antenna on the ground may also be used. A drone or driverless car could, in principle, have a similar antenna to a satellite to get a few more dB. Thus, at least a 10 dB improvement can readily be achieved. The bottom line is that, from a link budget perspective, the system is feasible, and moreover, has room for upgrades and improvement over time.

Determining Ephemerides and Error Correction

It should be noted that in some embodiments, rather than using precision ephemerides, the satellite may transmit "good enough" ephemerides, along with information that can be used to correct errors. In GPS, ground-based measurements are used to compute the satellite orbits to high precision, and this information is then uploaded to the satellites via a ground station. These updates may be up to two hours old, however, leading to satellite position inaccuracies, which becomes the primary contributor to ground location inaccuracies. Experiments have shown that updating the ephemeris more frequently (e.g., at 15-minute or 5-minute intervals) leads to vastly improved position accuracy, with 10-cm type accuracies having been demonstrated.

This approach is problematic when there are hundreds of satellites that are in LEO. The low orbit means that they are in view for approximately 15 minutes at a time, compared to 12 hours for GPS. The large number of satellites also significantly complicates updating from the ground, especially in an automated fashion, worldwide, let alone at a high update rate. Moreover, the technique does not scale well, becoming more and more difficult as more satellites are added.

The proposed approach of some embodiments bypasses these problems by using a set of ground beacons and letting each satellite determine its own orbit. The orbit precision improves with the number and diversity of measurements. As such, it is most accurate at the end of the satellite pass, as the satellite dips below the horizon before returning on the next pass about two hours later. To be useful for PNT, the satellite should receive accurate position information quickly, preferably on the very first beacon measurements as the satellite first pops above the horizon. Thus, algorithms for rapid update used in some embodiments are described below. The same technique may be used by a ground receiver, such that the satellite only needs to transmit a "good enough" ephemeris along with error correction information. This simplifies the receiver design, simplifies the satellite operations, and enables higher SNR transmissions since the error correction data is much smaller than the full ephemeris and may be transmitted at a lower data rate.

Satellite Orbit Determination

Each beacon transmits the time and location of the beacon (i.e., (x,y,z) coordinates or similar). The range equation is given by:

$$(x_{sat}-x_{bcn})^2+(y_{sat}-y_{bcn})^2+(z_{sat}-z_{bcn})^2=c^2(t_{sat}-t_{bcn})^2 \quad (1)$$

where $x_{sat}$ is the x coordinate of the satellite, $x_{bcn}$ is the x coordinate of the beacon, etc., and c is the speed of light. Corrections due to ionospheric delay are assumed to be corrected by using two transmit frequencies at the beacon, and without loss of generality, are not included above. Since x, y, z, $t_{bcn}$ are known, the remaining four variables in Eq. (1) are unknowns. Four independent beacon measurements results in a set of four nonlinear equations with four unknowns, which may be solved using the nonlinear least squares technique, allowing the satellite to determine its position (and time) at a particular instant in time. A process of determining an orbit from three position vectors may be used, which may be generalized to the case of many position vectors to determine the orbit to high accuracy over the course of a pass.

Correction Factor

After the initial orbit determination, the atomic clock will drift slightly and the satellite orbit will change slightly due to drag effects, such that the ephemerides will be off by the next pass. At the first 4-ball beacon measurement, the satellite will know: (a) what time it is; (b) what the current ephemeris says its position is; and (c) what its actual position is. The difference between the latter two (i.e., (b) and (c)) is the correction factor.

To first order, consider a spherical coordinate system aligned with the satellite orbital plane (a perifocal coordinate system) and a circular orbit. In this system, the satellite travels in a circle: r is constant, ϕ is constant, and θ increases linearly with time. The correction factor is an offset to those three values (r, ϕ, and θ). The satellite can calculate a position using the not-quite-right ephemerides and add the correction factor to get its actual position. As such, the satellite can calculate its position accurately without having perfect ephemerides.

In the more general case of a non-circular orbit, the same technique still applies as a linear approximation. That is, over a short time interval, the satellite orbit may be approximated as a circle to high accuracy. As the beacons are sending new positions every 5-10 seconds in some embodiments, a correction factor does not need to be accurate over the whole orbit—just for those 5-10 seconds until the satellite computes a new correction factor.

Receiver Location Determination

The same concept can be used at the ground receiver in some embodiments. If the satellite transmits "good enough" ephemerides and a true position, the ground receiver can compute a correction factor to determine the actual satellite position at any given time. Note that the satellite does not transmit the correction factor itself in some embodiments, just its position. The system concept in that case is that a receiver only has to receive the ephemerides once, which includes a relatively large amount of data at lower SNR, and can then focus on a much smaller data set at a higher SNR. Any given correction factor may apply to a specific ephemerides set. In contrast, if the satellite were to update its ephemeris (and hence, correction factor) the receiver would also have to receive the new ephemeris and correction factor, requiring the full data set to be transmitted and defeating the original concept. By transmitting the satellite position instead, the receiver can always calculate a correction factor regardless of the ephemeris it is using.

Note that for the drone/car mission, the ephemerides may be unnecessary. The satellite time and position by itself may be enough to locate the receiver at a specific instant in time, and modern inertial measurement units (IMUs) may be accurate enough to maintain resolution over the 5-10 seconds between position fixes. However, the information is useful for other missions, so it is included as part of the overall approach.

More Sophisticated Techniques

More deterministic estimation techniques exist that allow the computation of new ephemeris elements instead of just a position correction. There are six classical orbital elements. GPS transmits seventeen parameters, consisting of the basic six parameters plus additional correction coefficients and parameter rate of change values. In either case, however, only a few of these parameters are going to contribute to the error over a two-hour satellite revisit period (for example, the orbit inclination or eccentricity is not going to change significantly after one go around the Earth). Moreover, the mapping should be smooth—that is, only certain combinations of parameters will give the desired position correction. As a result, the process becomes a function minimization problem, for which many methods exist.

Determining satellite orbits from beacon observations consumes much/most of the satellite pass. Therefore, the satellite may use the beacon fixes to generate a position error correction factor to estimate its true position at any given time. This "true" satellite position can likewise be transmitted to a ground receiver, which can, in turn, generate an error correction factor to generate a precision solution for the receiver location.

This approach has several advantages over the current GPS approach. Since the satellites determine their own orbits, the ground station operations are vastly simplified, and the approach is scalable to an arbitrary number of satellites. This, in turn, enables a large, automated constellation to be used. Furthermore, the information required to correct the ephemeris is much smaller than the total ephemeris information, allowing it to be transmitted at a lower data rate, and hence, higher SNR for operations in disadvantaged locations or where jamming is more of a concern.

Figure 6:
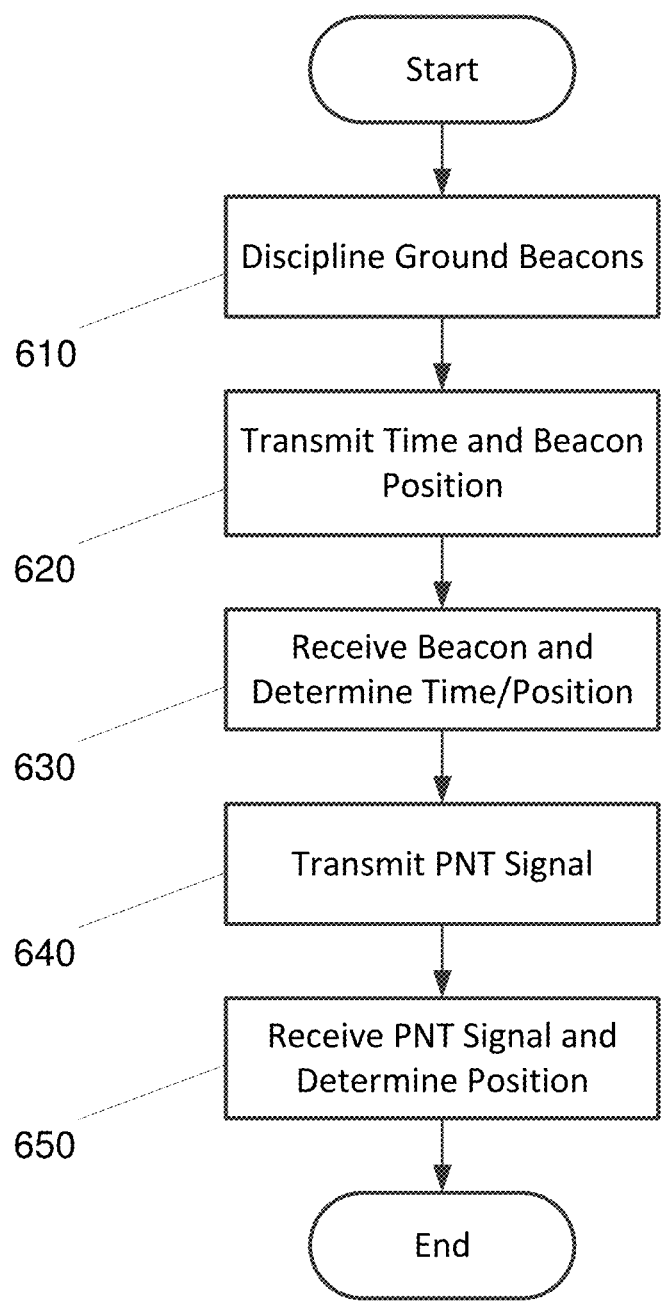
FIG. 6 is a flowchart illustrating a process for beacon-based PNT, according to an embodiment of the present invention.

FIG. 6 is a flowchart 600 illustrating a process for beacon-based PNT, according to an embodiment of the present invention. The process begins with disciplining ground beacons using a GPS or some other common, high accuracy clock signal at 610. In some embodiments, the beacon may be designed with a clock that does not require GPS disciplining. Once disciplined, the ground beacons transmit the time and their position at 620.

A satellite of a constellation of satellites receives the beacon and self-determines its time and position in real time at 630. The satellite then transmits a PNT signal at 640 that may be received by Earth-based receivers. The receivers (e.g., cell phones, cars, drones, etc.) receive the transmitted PNT signal, along with PNT signals from other satellites, and use the PNT signals to determine time and position to a high degree of accuracy at 650.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A precision navigation and timing (PNT) system, comprising:
at least four ground beacons configured to transmit PNT beacon signals; and
a space vehicle configured to:
receive the transmitted PNT beacon signals from the at least four ground beacons;
and
update a space vehicle ephemeris based on position and timing information in the received PNT beacon signals, wherein:
the space vehicle comprises a PNT module comprising a radio receiver configured to receive the transmitted PNT beacon signals from the at least four ground beacons, the radio receiver is configured to use a higher chipping rate and a larger Doppler shift and rate than GPS.

2. The PNT system of claim 1, wherein the PNT system comprises a constellation of space vehicles at altitudes of 1,000 to 2,000 kilometers.

3. The PNT system of claim 1, wherein the at least four ground beacons are configured to transmit a current time and their respective positions to the space vehicle in their respective PNT beacon signals.

4. The PNT system of claim 3, wherein, after receiving the respective PNT beacon signals from the at least four ground beacons, the space vehicle is configured to:
determine its time and position; and
transmit a space vehicle PNT signal that can be received by Earth-based receivers.

5. The PNT system of claim 1, wherein the space vehicle comprises:
a PNT module, comprising:
an atomic clock configured to provide a timing reference,
a field programmable gate array (FPGA), a microprocessor, or both, configured to process the received PNT beacon signals and generate timing and navigation data using information from the received PNT beacon signals and the timing reference from the atomic clock, and
a radio transmitter configured to transmit a space vehicle PNT signal based on the generated timing and navigation data.

6. The PNT system of claim 5, wherein the PNT module is configured to Transit multiple signals simultaneously, and each signal is modulated with a different Gold code, providing multiple different PNT channels of information.

7. The PNT system of claim 6, wherein each PNT channel comprises a spread-spectrum signal, and each PNT channel uses an 8.191 MHz chipping rate and a length 8191 Gold code with one millisecond per code.

8. The PNT system of claim 6, wherein a full ephemeris and ephemeris corrections are transmitted on separate PNT channels.

9. The PNT system of claim 6, wherein one PNT channel provides space vehicle position and another PNT channel provides spaces vehicle time and ionospheric correction, the ionospheric correction obtained by transmitting on two frequencies and comparing a time of arrival of each frequency.

10. The PNT system of claim 6, wherein a PNT channel is used to transmit (x,y,z) positions on a randomly changing center frequency for anti-jamming purposes.

11. The PNT system of claim 1, wherein the space vehicle is configured to receive the PNT beacon signals and update its position every five to ten seconds.

12. The PNT system of claim 11, wherein the space vehicle is configured to:
use the updated position to correct its time and ephemeris; and
transmit the corrected time and ephemeris such that ground-based receivers can calculate their respective locations on the ground.

13. The PNT system of claim 1, wherein each of the at least four beacons and the space vehicle comprise a PNT module having the same configuration.

14. The PNT system of claim 1, wherein at least one of the ground beacons, the space vehicle, or both, further comprise:
a PNT module, comprising:
a first radio for ground station communications; and
a second radio for PNT comprising an atomic clock, wherein
the second radio uses the atomic clock as a timing reference to maintain precision timing.

15. The PNT system of claim 14, wherein the PNT module further comprises:
an antenna;
a combiner configured to combine signals from transmitters of the first and second radio; and
a power amplifier configured to amplify the combined signal and send the combined signal to the antenna for transmission.

16. A PNT module, comprising:
a radio receiver configured to receive PNT beacon signals from ground beacons;
an atomic clock configured to provide a timing reference;
a field programmable gate array (FPGA), a microprocessor, or both, configured to process the received PNT beacon signals and generate timing and navigation data using information from the PNT beacon signals and the timing reference from the atomic clock; and a radio transmitter configured to transmit a PNT module signal based on the generated timing and navigation data, wherein the PNT module is configured to transit multiple signals simultaneously, and each signal is modulated with a different Gold code, providing multiple different PNT channels of information.

17. The PNT module of claim 16, wherein the radio receiver is configured to use a higher chipping rate and a larger Doppler shift and rate than GPS.

18. The PNT module of claim 16, wherein the radio receiver is configured to use forward error correction (FEC).

19. The PNT module of claim 16, wherein each PNT channel comprises a spread-spectrum signal, and each PNT channel uses an 8.191 MHz chipping rate and a length 8191 Gold code with one millisecond per code.

20. The PNT module of claim 16, wherein a full ephemeris and ephemeris corrections are transmitted on separate PNT channels.

21. The PNT module of claim 16, wherein one PNT channel provides position of a space vehicle and another PNT channel provides time and ionospheric correction, the ionospheric correction obtained by transmitting on two frequencies and comparing a time of arrival of each frequency.

22. The PNT module of claim 16, wherein a PNT channel is used to transmit (x,y,z) positions on a randomly changing center frequency for anti-jamming purposes.

23. The PNT module of claim 16, wherein the PNT module is configured to receive the PNT beacon signals and update its position every five to ten seconds.

24. The PNT module of claim 23, wherein the PNT module is configured to:

use the updated position to correct its time and ephemeris; and transmit the corrected time and ephemeris such that receivers of the transmitted corrected time and ephemeris can calculate their respective locations.

25. The PNT module of claim 16, further comprising:
a first radio for ground station communications; and
a second radio for PNT comprising the atomic clock and the radio transmitter.

26. The PNT module of claim 25, wherein the PNT module further comprises:

an antenna;

a combiner configured to combine signals from the radio transmitter of the second radio and a radio transmitter of the first radio; and a power amplifier configured to amplify the combined signal and send the combined signal to the antenna for transmission.

* * * * *